US012791382B2

(12) United States Patent
Kumamoto

(10) Patent No.: US 12,791,382 B2
(45) Date of Patent: Nov. 10, 2026

(54) SPECTROMETRY APPARATUS AND SPECTROMETRY METHOD

(71) Applicant: OSAKA UNIVERSITY, Osaka (JP)

(72) Inventor: Yasuaki Kumamoto, Osaka (JP)

(73) Assignee: OSAKA UNIVERSITY, Osaka (JP)

( * ) Notice: Subject to any disclaimer, the term of this patent is extended or adjusted under 35 U.S.C. 154(b) by 144 days.

(21) Appl. No.: 18/729,988

(22) PCT Filed: Nov. 17, 2022

(86) PCT No.: PCT/JP2022/042752
§ 371 (c)(1),
(2) Date: Jul. 19, 2024

(87) PCT Pub. No.: WO2023/145207
PCT Pub. Date: Aug. 3, 2023

(65) Prior Publication Data

US 2025/0116552 A1 Apr. 10, 2025

(30) Foreign Application Priority Data

Jan. 25, 2022 (JP) ................................ 2022-009137

(51) Int. Cl.
*G01J 3/02* (2006.01)
*G01J 3/44* (2006.01)
*G01N 21/65* (2006.01)

(52) U.S. Cl.
CPC ........... *G01J 3/0218* (2013.01); *G01J 3/0229* (2013.01); *G01J 3/0248* (2013.01); *G01J 3/44* (2013.01); *G01N 21/65* (2013.01)

(58) Field of Classification Search
CPC ...... G01J 3/0218; G01J 3/0229; G01J 3/0248; G01J 3/44; G01J 1/0437; G01J 3/021;
(Continued)

(56) References Cited

U.S. PATENT DOCUMENTS 5,615,673 A * 4/1997 Berger .................. G01J 3/0221 600/326
2006/0170916 A1 8/2006 Voigt et al.
(Continued)

FOREIGN PATENT DOCUMENTS

JP H04-31720 A 2/1992
JP 2008529091 A 7/2008
(Continued)

OTHER PUBLICATIONS

International Search Report issued in PCT/JP2022/042752, mailed Dec. 20, 2022.
(Continued)

*Primary Examiner* — Monica T Taba
(74) *Attorney, Agent, or Firm* — Troutman Pepper Locke LLP; Scott D. Wofsy; Gabrielle L. Gelozin

(57) ABSTRACT

A spectrometry apparatus (1) according to the present embodiment includes a light source (11) that produces illumination light, a spectrophotometer (50) that disperses signal light rays from a sample illuminated with the illumination light and detects the signal light rays by a photodetector (55), a fiber unit (40) having a plurality of fibers, the plurality of fibers (45) being adjacently arranged at an entrance end surface (411) of the fiber unit (40), and the plurality of fibers (45) being arranged in a multi-line shape at intervals at an exit end surface, and a processing unit that, by referring to a positional relationship among the plurality of fibers (45) at the entrance end surface and an exit end surface of the fiber unit (40), generates a spectroscopic image of the sample S from a result of detection by the photodetector.

10 Claims, 10 Drawing Sheets

(58) Field of Classification Search
CPC .. G01J 3/027; G01J 3/0294; G01J 3/10; G01J 3/0221; G01J 3/18; G01N 21/65
See application file for complete search history.

(56) References Cited

U.S. PATENT DOCUMENTS

| | | | | |
|---|---|---|---|---|
| 2007/0132998 | A1 | 6/2007 | Tang et al. | |
| 2009/0040519 | A1 | 2/2009 | Zhang | |
| 2010/0265502 | A1* | 10/2010 | Nelson | G01J 3/02 356/317 |
| 2014/0268104 | A1* | 9/2014 | Treado | G01J 3/44 356/51 |
| 2015/0085099 | A1* | 3/2015 | Kleppe | G02B 21/008 348/80 |
| 2020/0003618 | A1* | 1/2020 | Fujita | G01J 3/2823 |

FOREIGN PATENT DOCUMENTS

| | | | |
|---|---|---|---|
| JP | 2012-237647 | A | 12/2012 |
| JP | 2018-128325 | A | 8/2018 |
| JP | 2019-95280 | A | 6/2019 |
| JP | 2020-126045 | A | 8/2020 |
| WO | 2006083715 | A2 | 8/2006 |

OTHER PUBLICATIONS

High-resolution confocal Raman microscopy using pixel reassignment Roider, et al., Optics Letters vol. 41, Issue 16, pp. 3825-3828 (2016).
Tissue diagnosis using power-sharing multifocal Raman micro-spectroscopy and auto-fluorescence imaging Sinjab, et al., Biomed. Opt. Express 7, 2993 (2016).
Rapid and accurate peripheral nerve imaging by multipoint Raman spectroscopy Kumamoto, et al., Sci. Rep. 7, 845 (2017).
Internet search: https://www.tem-inc.co.jp/products/detail-29.php.
S. Faris et al., "Applications of spatial light modulators in Raman spectroscopy," Applied Spectroscopy, Jan. 7, 2019, XP055957985.
J. Qi et al., High-speed hyperspectral Raman imaging for label-free compositional microanalysis, Biomedical Optics Express, Aug. 10, 2013, XP093258154.
Extended European Search Report issued in EP 22924059.3, mailed Mar. 24, 2025.
Japanese Office Action dated Jun. 24, 2025, issued during the prosecution of Japanese Patent Application No. JP 2023576643.

* cited by examiner

SPECTROMETRY APPARATUS AND SPECTROMETRY METHOD

CROSS-REFERENCE TO RELATED APPLICATIONS

This application is a U.S. National Phase Application filed under 35 U.S.C. § 371, based on International Patent Application No. PCT/JP2022/042752, filed Nov. 17, 2022, which claims priority to Japanese Patent Application No. JP 2022-009137, filed on Jan. 25, 2022, which are incorporated herein by reference.

TECHNICAL FIELD

The present invention relates to a spectrometry apparatus and a spectrometry method, and more particularly relates to a spectrometry apparatus for subjecting signal light rays such as Raman scattered light produced from a sample to spectrometry to generate a spectroscopic image, and a spectrometry method.

BACKGROUND ART

Patent Literature 1 and Non Patent Literature 1 to Non Patent Literature 3 disclose methods for measuring Raman spectra. Patent Literature 1 discloses a multifocal confocal Raman microscope through use of a fiber bundle. Light rays from a pinhole array respectively enter an entrance end of the fiber bundle. In Non Patent Literature 1, a fiber bundle is laid out in front of a spectrophotometer. In addition, in Non Patent Literature 1, fibers are aligned at an exit end.

In Non Patent Literature 2, illumination light is modulated by a liquid-crystal spatial light modulator to generate multiple focuses. Non Patent Literature 3 discloses a multifocal confocal Raman spectroscopic microscope. In Non Patent Literature 3, multiple foci are generated using a microlens array. Moreover, in Non Patent Literature 3, multiple fibers are used.

CITATION LIST

Patent Literature

Patent Literature 1:
Japanese Unexamined Patent Application Publication No. 2012-237637

Non Patent Literature

Non Patent Literature 1:
"High-resolution confocal Raman microscopy using pixel reassignment" Roider, et al., Optics Letters Vol. 41, Issue 16, pp. 3825-3828 (2016)
Non Patent Literature 2:
"Tissue diagnosis using power-sharing multifocal Raman micro-spectroscopy and auto-fluorescence imaging" Sinjab, et al., Biomed. Opt. Express 7, 2993 (2016).
Non Patent Literature 3:
"Rapid and accurate peripheral nerve imaging by multipoint Raman spectroscopy" Kumamoto, et al., Sci. Rep. 7, 845 (2017).
Non Patent Literature 4:
Internet search: https://www.tem-inc.co.jp/products/detail-29.php [searched on Dec. 8, 2021]

SUMMARY OF INVENTION

In a case where weak signal light rays such as Raman scattered light are subjected to spectrometry, a measurement time becomes long. Particularly in a case where imaging is performed, a plurality of spatial coordinate positions are sequentially measured, which takes a long time. However, when the measurement time per coordinate is reduced, an influence of noise occurs. Thus, there is a demand for measuring an appropriate spectroscopic image in a short time.

The present disclosure has been made in view of the above points and has an object to provide a spectrometry apparatus that enables an appropriate spectroscopic image to be generated by short-time measurement, and a spectrometry method.

A spectrometry apparatus according to the present embodiment includes a light source that produces illumination light, a spectrophotometer that disperses signal light rays from a sample illuminated with the illumination light and detects the signal light rays by a two-dimensional array photodetector, a fiber unit having a plurality of fibers laid out in an optical path from the sample to the spectrophotometer, the plurality of fibers being adjacently arranged at an entrance end surface of the fiber unit, and the plurality of fibers being arranged in a multi-line shape at intervals at an exit end surface, and a processing unit that, by referring to a layout relationship among the plurality of fibers at the entrance end surface and the exit end surface of the fiber unit, generates a spectroscopic image of the sample from a result of detection by the two-dimensional array photodetector.

The above-described spectrometry apparatus may further include a spatial light modulator that modulates the illumination light from the light source so as to selectively illuminate a plurality of spots on the sample, in which signal light rays from the plurality of spots may enter the fibers of the fiber unit, respectively.

The above-described spectrometry apparatus may further include a camera that captures an optical image of the sample, in which the plurality of spots on the sample extracted based on the optical image may be selectively illuminated.

In the above-described spectrometry apparatus, the plurality of fibers may have a hexagonal close-packed arrangement at the entrance end surface of the fiber unit.

In the above-described spectrometry apparatus, the entrance end surface of the fiber unit may be laid out at a position conjugate to the sample.

In the above-described spectrometry apparatus, signal light rays exited from different ones of the fibers may be detected without being overlapped at a light-receiving surface of the two-dimensional array photodetector.

A spectrometry method according to the present embodiment includes steps of illuminating a sample using illumination light from a light source, causing signal light rays from the sample to enter a fiber unit from an entrance end surface at which a plurality of fibers are adjacently arranged, causing the signal light rays to exit from an exit end surface of the fiber unit at which the plurality of fibers are arranged in a multi-line shape at intervals, dispersing the signal light rays exited from the exit end surface and detecting the signal light rays by a two-dimensional array photodetector, and referring to a layout relationship among the plurality of fibers at the entrance end surface and the exit end surface of the fiber unit, generating a spectroscopic image of the sample from a result of detection by the two-dimensional array photodetector.

In the above-described spectrometry method, a spatial light modulator may modulate the illumination light from the light source so as to selectively illuminate a plurality of spots on the sample, and signal light rays from the plurality of spots may enter the fibers of the fiber unit, respectively.

In the above-described spectrometry method, an optical image of the sample may be captured by a camera, and the plurality of spots on the sample extracted based on the optical image may be selectively illuminated.

In the above-described spectrometry method, the plurality of fibers may have a hexagonal close-packed arrangement at the entrance end surface of the fiber unit.

In the above-described spectrometry method, the entrance end surface of the fiber unit may be laid out at a position conjugate to the sample.

In the above-described spectrometry method, signal light rays exited from different ones of the fibers may be detected without being overlapped at a light-receiving surface of the two-dimensional array photodetector.

According to the present invention, a spectrometry apparatus that enables an appropriate spectroscopic image to be generated by short-time measurement, and a spectrometry method can be provided.

DESCRIPTION OF EMBODIMENT

Figure 1:
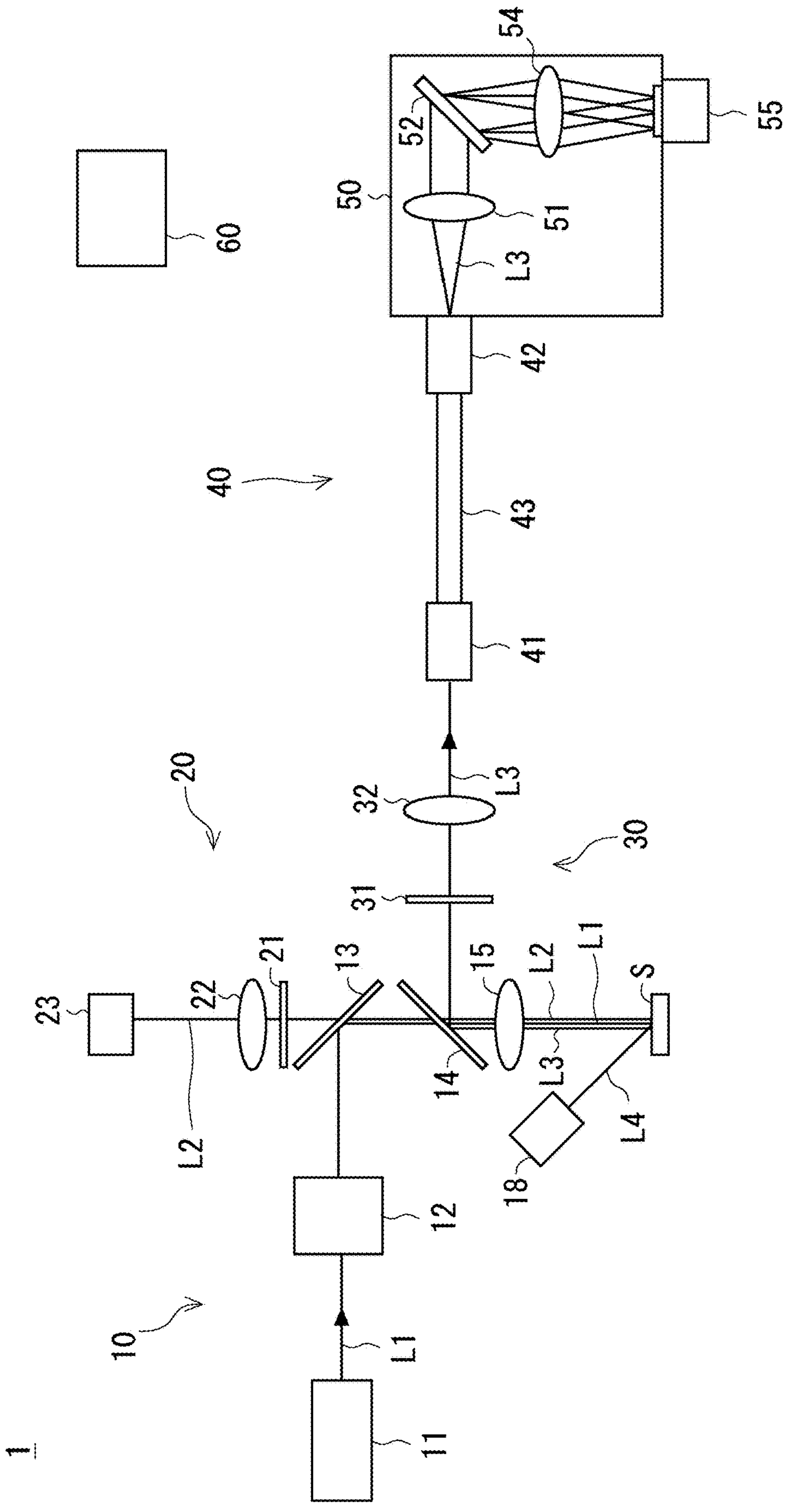
FIG. 1 is a schematic diagram showing a spectrometry apparatus according to a first embodiment.

Hereinafter, an embodiment to which the present invention is applicable will be described. The following description will describe an embodiment of the present invention, and the present invention is not limited to the following embodiment. For clarification of description, omission and simplification will be made in the following statement as appropriate. A person of ordinary skill in the art will be able to easily change, add, and replace each element in the following embodiment within the scope of the present invention. Note that elements denoted by the same reference character in the respective drawings indicate the same element, and description thereof will be omitted as appropriate.

First Embodiment

A spectrometry apparatus and a measurement method thereof according to a first embodiment will be described with reference to FIG. 1. FIG. 1 is a schematic diagram showing an optical system of a spectrometry apparatus 1. The spectrometry apparatus 1 is a spectroscopic microscope that captures a spectroscopic image of a sample S. More specifically, the spectrometry apparatus 1 measures spectral data on Raman scattered light from the sample S.

The spectrometry apparatus 1 includes a spectroscopic illumination optical system 10, an observation illumination light source 18, an observation optical system 20, a spectrometric optical system 30, a fiber unit 40, a spectrophotometer 50, and a processing apparatus 60. First, the spectroscopic illumination optical system 10 will be described. The spectroscopic illumination optical system 10 is an optical system for guiding illumination light L1 to the sample S. The spectroscopic illumination optical system 10 includes a light source 11, a spatial light modulator 12, a dichroic mirror 13, a dichroic mirror 14, and a lens 15.

The light source 11 is a laser light source that produces spectrometric illumination light. The spectrometric illumination light will be simply referred to as the illumination light L1. The light source 11 is a DPSS (Diode Pumped Solid State) laser that emits CW (Continuous Wave) light having a wavelength of 660 nm. It is needless to say that the light source 11 is not limited to a particular type and laser wavelength. In spectrometry, the illumination light L1 becomes excitation light for exciting the sample S. Therefore, the light source 11 produces the illumination light L1 which is monochrome.

The illumination light L1 from the light source 11 enters the spatial light modulator 12. The spatial light modulator 12 spatially modulates the illumination light L1 based on a control signal from the processing apparatus 60. The spatial light modulator 12 controls a spatial distribution of the illumination light L1 on the sample S. Accordingly, a region that the illumination light L1 enters on the sample S can have a desired shape and size. For example, the spatial light modulator 12 modulates the illumination light L1 so as to illuminate only ROIs of the sample.

The spatial light modulator 12 is a liquid crystal device such as LCOS (Liquid crystal on silicon), for example. The spatial light modulator 12 is a liquid crystal panel including pixels arranged in an array shape. By controlling a voltage to be applied to each pixel, the phase of reflected light can be modulated. It is needless to say that the spatial light modulator 12 is not limited to a reflection-type liquid crystal device such as LCOS, and may be a transmission-type liquid crystal device. Alternatively, the spatial light modulator 12 is not limited to a liquid crystal device, and DMD or the like can be used.

The illumination light L1 from the spatial light modulator 12 enters the dichroic mirror 13. The dichroic mirror 13 splits the light in accordance with the wavelength. The dichroic mirror 13 reflects the wavelength of the illumination light L1. Thus, the dichroic mirror 13 reflects the illumination light L1 toward the dichroic mirror 14.

The dichroic mirror 14 splits the light in accordance with the wavelength. The dichroic mirror 14 transmits the wavelength of the illumination light L1. Thus, the illumination light L1 transmitted through the dichroic mirror 14 enters the lens 15. The lens 15 is an objective lens and focuses the illumination light L1 on the sample S. Accordingly, the sample S is illuminated with the illumination light L1. The illumination light L1 has been modulated by the spatial light modulator 12. Thus, the illumination light L1 can illuminate a desired region on the sample S. Note that the sample S is placed on a stage not shown. The stage may be a driven stage in order to change the illuminated position of the sample S.

Next, the observation illumination light source 18 and the observation optical system 20 will be described. The observation illumination light source 18 is a lamp light source, for example, and produces white observation illumination light L4. The observation illumination light L4 from the observation illumination light source 18 illuminates the sample S. It is needless to say that the observation illumination light source 18 is not limited to the white lamp light source. A non-monochrome light source can be used as the observation illumination light source 18.

The observation optical system 20 is an optical system for guiding observation light L2 from the sample S to a camera 23. The observation light L2 is light from a region illuminated with the observation illumination light L4. For example, the observation light L2 is scattered light scattered by the sample S, reflected light reflected off the sample S, fluorescence produced from the sample S, or the like. The observation optical system 20 includes the lens 15, the dichroic mirror 14, the dichroic mirror 13, a filter 21, and a lens 22.

The observation light L2 from the sample S is refracted by the lens 15 to enter the dichroic mirror 14. The observation light L2 transmitted through the dichroic mirror 14 enters the dichroic mirror 13. The observation light L2 transmitted through the dichroic mirror 13 enters the filter 21.

The filter 21 is an optical filter and transmits part of the light from the sample S. Specifically, the filter 21 is a wavelength filter that transmits or shields light in accordance with the wavelength. Accordingly, the camera 23 which will be described later can detect only the observation light L2 having a desired wavelength. In other words, light having a wavelength transmitted through the dichroic mirror 14, the dichroic mirror 13, and the filter 21 becomes the observation light L2.

The observation light L2 transmitted through the filter 21 enters the lens 22. The lens 22 is an image-forming lens and focuses an image of the sample S on a light receiving surface of the camera 23. The camera 23 is a two-dimensional photodetector such as a CCD (Charge Coupled Device) camera or a CMOS (Complementary Metal Oxide Semiconductor) image sensor. Therefore, the camera 23 captures a two-dimensional optical image of the sample S.

The processing apparatus 60 is an information processing apparatus such as a personal computer. The camera 23 outputs captured data on the optical image of the sample S to the processing apparatus 60. The processing apparatus 60 stores the captured data on the optical image in a memory or the like. That is, the processing apparatus 60 stores luminance data in accordance with a light receiving amount per pixel of the camera 23. The processing apparatus 60 has a display that displays the optical image, and the like. A user can extract an ROI on the sample S by checking the optical image captured by the camera 23. For example, the user can select the ROI on a display screen of the processing apparatus 60. Accordingly, coordinates on the optical image are specified.

Note that the dichroic mirror 14 may be removably laid out on an optical path. When the optical image of the sample S is observed, the dichroic mirror 14 may be detached from the optical path. That is, the dichroic mirror 14 should only be inserted onto the optical path at the time of spectrometry.

Next, the spectrometric optical system 30 will be described. The spectrometric optical system 30 is an optical system from the sample S to a photodetector 55 of the spectrophotometer 50. That is, the spectrometric optical system 30 guides signal light rays L3 produced from the sample S to the photodetector 55. The spectrometric optical system 30 includes the lens 15, the dichroic mirror 14, a filter 31, a lens 32, the fiber unit 40, and the spectrophotometer 50.

The signal light rays L3 produced from the sample S enter the lens 15. The signal light rays L3 refracted by the lens 15 enter the dichroic mirror 14. The dichroic mirror 14 transmits light having the laser wavelength. The dichroic mirror 14 reflects the signal light rays L3 having a wavelength different from the wavelength of the illumination light L1 toward the filter 31.

The signal light rays L3 reflected off the dichroic mirror 14 enter the filter 31. The filter 31 is an optical filter and transmits part of the light from the sample S. Specifically, the filter 31 is a wavelength filter that transmits or shields light in accordance with the wavelength. Specifically, the filter 31 shields light having the laser wavelength of the light source 11 and transmits light in a predetermined wavelength band. Accordingly, the spectrophotometer 50 which will be described later can subject the signal light rays L3 having a wavelength different from the laser wavelength to spectrometry.

The signal light rays L3 transmitted through the filter 31 enter the lens 32. The lens 32 is an image-forming lens and forms an image of the sample S at the entrance end of the fiber unit 40. That is, the entrance end surface of the fiber unit 40 is laid out at a position conjugate to the sample S. The fiber unit 40 has a plurality of fibers and guides the entered signal light rays L3 to the spectrophotometer 50. The fiber unit 40 includes an entrance-side holder 41, an exit-side holder 42, and a connecting section 43.

The fiber unit 40 is a bundle fiber formed by binding a plurality of fibers. The fiber unit 40 is laid out in an optical path from the sample S to the spectrophotometer 50. The fiber unit 40 has different fiber layouts at the entrance end surface and the exit end surface of the fiber unit 40 including the entrance-side holder 41, the exit-side holder 42, and the connecting section 43.

The entrance-side holder 41 is a cylindrical holder, for example, and houses a plurality of fibers therein. The entrance-side holder 41 fixes the plurality of fibers at the entrance end surface side of the fiber unit 40. Therefore, at the entrance end side of the fiber unit 40, the plurality of fibers are adjacently arranged. Specifically, the plurality of fibers have a close-packed arrangement (a fine pitch arrangement or a dense arrangement).

The exit-side holder 42 is a cylindrical holder, for example, and houses a plurality of fibers therein. The exit-side holder 42 fixes the plurality of fibers at the exit end surface side of the fiber unit 40. At the exit end side of the fiber unit 40, the plurality of fibers are arranged in a multi-line shape at intervals. This enables spectrometry in the multifocal optical system.

The connecting section 43 connects the entrance-side holder 41 and the exit-side holder 42. The connecting section 43 is a flexible portion laid out between the entrance-side holder 41 and the exit-side holder 42. A configuration of the fiber unit 40 will be described later.

The exit end of the fiber unit 40 is laid out immediately in front of the spectrophotometer 50. The signal light rays L3 propagated through the fibers of the fiber unit 40 exit through the exit end of the fiber unit 40 and enter the spectrophotometer 50. The signal light rays L3 from the sample S enter the spectrophotometer 50 through the fiber unit 40.

The spectrophotometer 50 includes a lens 51, a grating 52, a lens 54, and the photodetector 55. The signal light rays L3 from the fiber unit 40 enter the lens 51. The lens 51 refracts the signal light rays L3 so as to be a parallel light bundle. The signal light rays L3 from the lens 51 enter the grating 52. The grating 52 is a wavelength dispersion element that disperses the signal light rays L3 in accordance with the wavelength. The grating 52 has a diffraction angle in accordance with the wavelength. A direction of dispersing the signal light rays L3 by the grating 52 is referred to as an X direction.

Since the grating 52 is herein shown as a transmission-type diffraction grating, the signal light rays L3 reflected off the grating 52 enter the lens 54. Note that the wavelength dispersion element is not limited to the transmission-type diffraction grating, and may be a reflection-type diffraction grating, a prism, or the like.

The signal light rays L3 subjected to wavelength dispersion by the grating 52 enter the lens 54. The lens 54 focuses the signal light rays L3 on a light receiving surface of the photodetector 55. The photodetector 55 is a two-dimensional array photodetector such as a CCD (Charge Coupled Device) camera or a CMOS (Complementary Metal Oxide Semiconductor) image sensor. The photodetector 55 has a plurality of pixels arranged in the X direction and a Y direction, for example. Note that the X direction and the Y direction are directions orthogonal to an optical axis of the optical system. That is, the XY plane is a plane orthogonal to the optical axis.

In a case in which the wavelength dispersion direction is the X direction, an X coordinate of the photodetector 55 corresponds to the wavelength and spatial positions of the signal light rays L3. An image at the exit end of the fiber unit 40 is formed on the light receiving surface of the photodetector 55. A spectroscopic image of the sample S dispersed by the spectrophotometer 50 can be captured by the photodetector 55.

Figure 2:
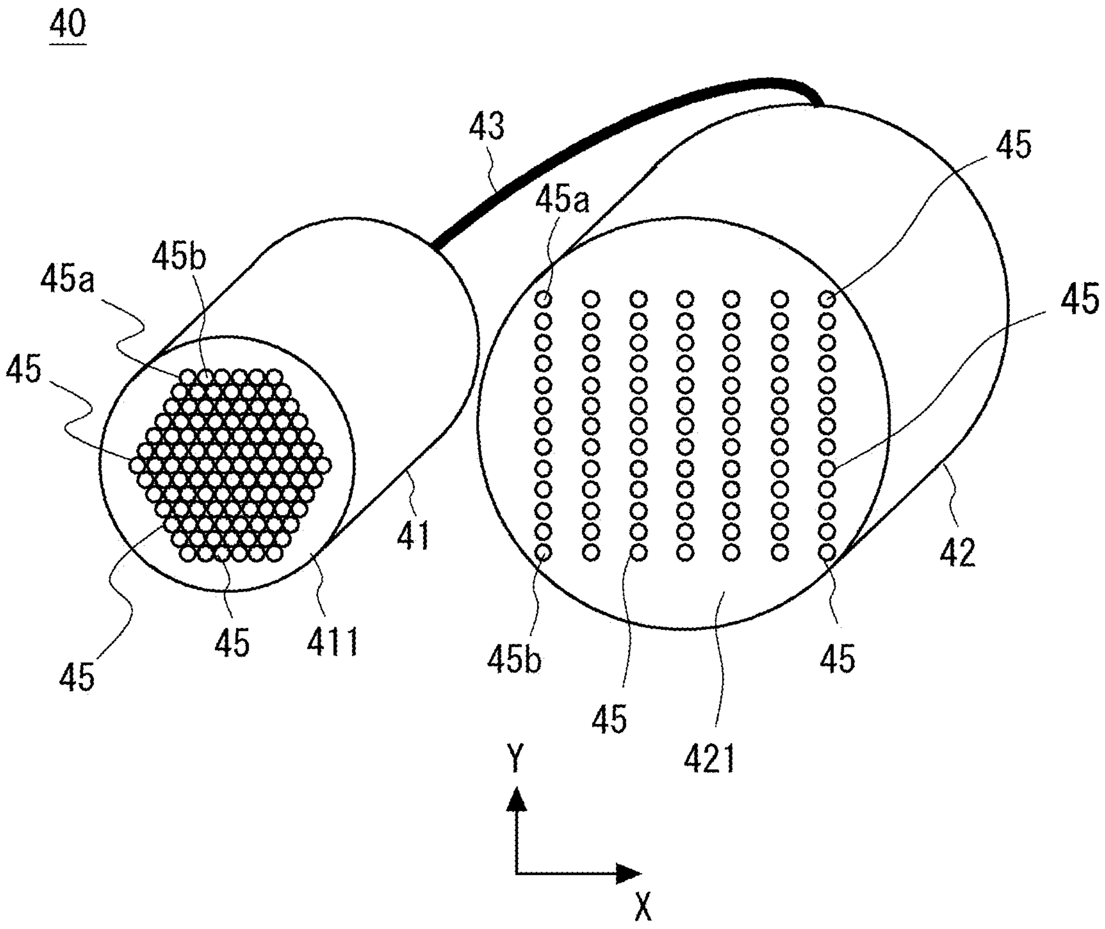
FIG. 2 is a diagram showing fiber layouts at an entrance end and an exit end of a fiber unit.

Next, the configuration of the fiber unit 40 will be described with reference to FIG. 2. FIG. 2 is a diagram schematically showing the configuration of the fiber unit 40.

The fiber unit 40 has a plurality of fibers 45. The entrance-side holder 41 fixes the plurality of fibers 45 at the entrance end surface 411 of the fiber unit 40. The plurality of fibers 45 are adjacently arranged at the entrance end surface 411 of the fiber unit 40. The fibers 45 have circular entrance ends, and the plurality of fibers 45 are arranged such that each circle comes into contact with adjacent circles.

The entrance end surface 411 is located at a position conjugate to the sample S. An image of the sample S is formed at the entrance end surface 411. In other words, the signal light ray L3 from one light-irradiated spot on the sample enters one or more of the fibers 45. By arranging the fibers 45 so as to be proximate to one another, gaps among the fibers 45 can be reduced.

Accordingly, a region on the sample S which cannot be subjected to spectrometry can be reduced. If the signal light rays L3 from the sample S enter the gaps among the fibers 45, the signal light rays L3 do not reach the spectrophotometer 50. When the fibers 45 have a close-packed layout, the gaps among the fibers 45 can be reduced in area. Thus, the region which cannot be subjected to spectrometry can be reduced.

Non Patent Literature 4 (https://www.tem-inc.co.jp/products/detail-29.php) discloses a technology for numbering a plurality of fibers to perform mapping. By using this technology, the gaps among the fibers can be eliminated, or the fibers can be laid out with fewer gaps. By subjecting the fibers to fusion treatment, a honeycomb structure is obtained, so that the gaps among the fibers are eliminated. Alternatively, adjacent fibers may be bonded with an adhesive agent such as epoxy resin.

In more detail, at the entrance end surface 411, one thousand and eight hundred fibers 45 have a two-dimensional close-packed arrangement (fine pitch or dense arrangement). The plurality of fibers 45 have a hexagonal close-packed arrangement. Thus, one fiber 45 is arranged to come into contact with surrounding six fibers 45. In other words, each of the plurality of fibers 45 is in contact with six fibers 45. Furthermore, the fibers 45 are not arranged in a matrix shape. That is, two arranging directions at the entrance end surface 411 are not orthogonal.

The entrance-side holder 41 holds the fibers 45 at the entrance end surface 411 of the fiber unit 40 such that the plurality of fibers 45 have a close-packed layout. That is, the entrance-side holder 41 fixes the plurality of fibers 45 such that the fibers 45 are adjacently arranged. With such a configuration, the sample S can be subjected to spectrometry more appropriately.

An image at an exit end surface 421 is formed on the light-receiving surface of the photodetector 55. The plurality of fibers 45 are arranged in a multi-line shape at intervals at the exit end surface 421. At the exit end surface 421, the exit-side holder 42 holds the plurality of fibers 45 such that the plurality of fibers 45 are arranged at intervals from one another.

The plurality of fibers 45 are arranged in the X direction and the Y direction at the exit end surface 421. The plurality of fibers 45 are arranged in a two-dimensional matrix shape. The two arranging directions at the exit end surface 421 are not orthogonal. The plurality of fibers 45 are arranged at regular intervals in the X direction. Similarly, the plurality of fibers 45 are arranged at regular intervals in the Y direction. As described, the exit-side holder 42 holds the plurality of fibers 45 such that the plurality of fibers 45 are arranged at constant intervals.

The one thousand and eight hundred fibers 45 are arranged in a 15×120 matrix shape. That is, the fibers 45 are arranged in a multi-line shape of fifteen lines, and one hundred and twenty fibers 45 are included in one line. The one hundred and twenty fibers 45 included in one line are laid out in parallel in the Y direction.

Specifically, the one thousand and eight hundred fibers 45 are laid out at the entrance end surface 411 in a circular region having a diameter of approximately 2 to 3 cm. One fiber 45 has a circular shape having a diameter of approximately 45 μm. A circular region having a diameter of approximately 90 μm is detected on the sample S by the photodetector 55. That is, the circular region having a diameter of approximately 90 μm is enlarged to form an image on the entrance end surface 411 of the fiber unit 40. Thus, the signal light rays L3 from this circular region are detected by the photodetector 55 simultaneously.

At the exit end surface 421, the one thousand and eight hundred fibers 45 are laid out in a rectangular region of approximately 14 to 15 cm in the X direction and approximately 6 to 7 cm in the Y direction. Note that multiple slits corresponding to the multiple lines may be provided in the exit end surface 421.

The exit-side holder 42 fixes the plurality of fibers 45 such that the plurality of fibers 45 are arranged at intervals at the exit end surface 421. The density of the plurality of fibers 45 at the entrance end surface 411 is higher than the density of the plurality of fibers 45 at the exit end surface 421. In other words, the fibers 45 are sparsely laid out at the exit end surface 421, and the fibers 45 are closely laid out at the entrance end surface 411.

Specifically, it is preferable that the fibers 45 should have a density of 60% or greater in the region in which the fibers 45 are arranged. That is, the fibers 45 are closely laid out such that an area of 60% or greater is occupied by the fibers 45 in the region in which the fibers 45 are arranged. In other words, it is preferable that a region of the gaps among the fibers 45 should be less than 40%. It is more preferable that the fibers 45 should have a density of 75% or greater in the region in which the fibers 45 are arranged. In this case, the fibers 45 are closely laid out such that an area of 75% or greater is occupied by the fibers 45 in the region in which the fibers 45 are arranged. It is preferable that the region of the gaps among the fibers 45 should be less than 25%.

With such a configuration, the signal light rays L3 exited from adjacent ones of the fibers 45 enter the photodetector 55 without being overlapped. That is, the signal light rays L3 from different ones of the fibers 45 are detected by different pixels of the photodetector 55. With such a configuration, a spectroscopic image can be appropriately measured.

The signal light rays L3 exited from the fiber unit 40 as described above are dispersed by the spectrophotometer 50. Herein, a dispersing direction in the spectrophotometer 50 shall be the X direction. A pixel address in the X direction in the photodetector 55 indicates a spectroscopic wavelength and a spatial position. A pixel address in the Y direction indicates a position on the multiple lines.

Figure 3:
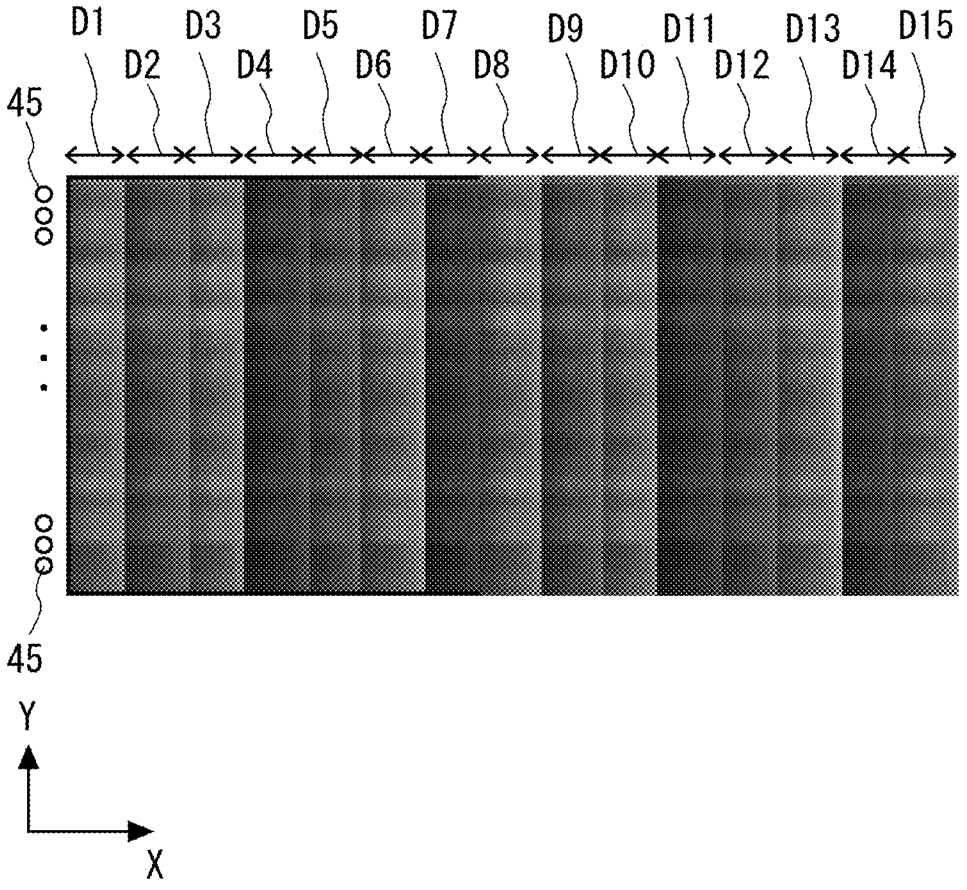
FIG. 3 is a diagram showing an image of a light receiving surface of a photodetector.

The light receiving surface of the photodetector 55 will be described with reference to FIG. 3. FIG. 3 is a diagram showing an image at the light receiving surface of the photodetector 55. Pixels of the photodetector 55 are arranged such that arranging directions are the X direction and the Y direction. FIG. 3 also schematically shows the fibers 45 included in one line. Herein, the arranging direction of the fibers 45 included in one line is in parallel to the Y direction. An arranging direction of a plurality of lines is in parallel to the X direction. Thus, the arranging direction of the fibers 45 and a pixel arranging direction are parallel. In addition, the direction of dispersing by the grating 52 is the X direction.

Therefore, spectral data in the fibers 45 in one line is measured by a strip-shaped detection region at the light receiving surface. In FIG. 3, a detection region in which spectral data in the fibers 45 included in the first line is measured is shown as a detection region D1. Similarly, detection regions in which spectral data in the fibers 45 in the second to fifteenth lines is measured are shown as detection regions D2 to D15, respectively. Since one hundred and twenty fibers 45 are included in one line, one hundred and twenty pieces of spectral data can be measured in the one detection region D1.

The detection regions D1 to D15 are laid out so as not to be overlapped on one another. For example, the detection region D1 and the detection region D2 are offset in the Y direction. The spectrophotometer 50 shall disperse signal light rays on a long-wavelength side to the +X side and the signal light rays L3 on a short-wavelength side to the −X side. A pixel address corresponding to the longest wavelength in the detection region D1 is located on the −X side relative to a pixel address corresponding to the shortest wavelength in the detection region D2. Specifically, the filter 31 restricts a wavelength range of the signal light rays L3 such that the detection regions D1 to D15 are not overlapped. The gap among the fibers 45 in the X direction at the exit end surface 421 shall be a predetermined value or greater.

The fibers 45 are laid out separately from one another at the exit end surface 421. As shown in FIG. 3, for example, the fibers 45 included in one line are laid out at intervals in the Y direction. Thus, the signal light rays L3 from adjacent ones of the fibers 45 enter pixels having different addresses in the Y direction. The signal light rays L3 from the respective fibers 45 are detected by different pixels. In other words, the signal light ray L3 from one of the fibers 45 does not enter a pixel that the signal light ray L3 from another one of the fibers 45 enters.

With such a design, the signal light rays L3 from the respective fibers 45 are detected without being overlapped. Thus, Raman spectra at a plurality of spots on the sample S can be measured with a single shot (a single frame) of the photodetector 55 without scanning the sample S with the illumination light L1. Accordingly, Raman scattered light from the two-dimensional region on a plane orthogonal to the optical axis can be detected.

Alternatively, some of the signal light rays from the respective fibers 45 may be detected in an overlapped manner. In this case, original spectra can be restored by a mathematical technology such as a compression sensing technology. In this case, the signal light ray L3 from one of the fibers 45 can be subjected to wavelength dispersion to a larger number of pixels. Thus, the wavelength range that can be subjected to spectrometry can be widened. Alternatively, wavelength resolution can be improved.

The signal light rays L3 from the respective fibers 45 can be independently subjected to spectrometry. The signal light rays L3 from one thousand and eight hundred spots on the sample S can be simultaneously subjected to spectrometry. In other words, a two-dimensional spectroscopic image of one thousand and eight hundred pixels can be captured in a short time. The signal light rays L3 from any one light-irradiated spot (a single location) on the sample S enters one of the fibers 45. A spectrum of the signal light rays L3 exited from the one of the fibers 45 corresponds to spectral data on the one light-irradiated spot (the single location) on the sample S.

For example, the fiber unit 40 has the one thousand and eight hundred fibers 45. Thus, the spectrometry apparatus 1 can detect one thousand and eight hundred Raman spectra. That is, the spectrometry apparatus 1 can subject the signal light rays L3 from one thousand and eight hundred spots on the sample S to spectrometry, respectively. The processing apparatus 60 generates a spectroscopic image of the sample S based on a detection signal of the photodetector 55. That is, a spectroscopic image is generated based on one thousand and eight hundred pieces of spectral data. Hereinafter, a process of generating a spectroscopic image by the processing apparatus 60 will be described.

As described above, the entrance-side holder 41 and the exit-side holder 42 are connected by the connecting section 43. The connecting section 43 is obtained by binding the plurality of fibers 45 in a deformable manner. A correspondence relationship between the position of each of the fibers 45 at the entrance end surface 411 and the position of each of the fibers 45 at the exit end surface 421 is already known. For example, for a certain fiber 45*a*, the position at the entrance end surface 411 and the position at the exit end surface 421 are associated. Similarly, for another fiber 45*b*, the position at the entrance end surface 411 and the position at the exit end surface 421 are associated.

As described, the position at the exit end surface 421 of the fiber 45 located at any position at the entrance end surface 411 is already known. The processing apparatus 60 stores information indicating a layout relationship of each of the fibers 45. That is, the processing apparatus 60 stores the correspondence relationship between the position of the fiber 45 at the entrance end surface 411 and its position at the exit end surface 421. Referring to the layout relationship of each of the fibers 45, the processing apparatus 60 generates a spectroscopic image from a result of detection by the photodetector 55. The processing apparatus 60 rearranges detected data for each of pixels of the photodetector 55 so as to conform with the fiber arrangement at the entrance end surface 411. As described, the processing apparatus 60 creates a two-dimensional spectroscopic image by two-dimensional mapping.

As described, the fibers 45 are arranged at the entrance end surface 411 more closely than at the exit end surface 421. Therefore, the photodetector 55 can detect the signal light rays L3 from a larger number of spots on the sample S. For positions on the sample corresponding to the region in which the fibers 45 have the close-packed arrangement, the signal light rays propagate through any of the fibers 45 and are detected by the photodetector 55.

Since the fibers 45 are arranged in the multi-line shape at the exit end surface 421, the spectrophotometer 50 can subject the signal light rays L3 from the plurality of fibers 45 to spectrometry simultaneously. That is, the signal light rays L3 exited from the fiber 45 is detected independently from the signal light rays L3 exited from another one of the fibers 45. Accordingly, the spectrophotometer 50 can subject the signal light rays L3 from a larger number of the fibers 45 to spectrometry.

The spectrometry apparatus 1 can capture a two-dimensional spectroscopic image without scanning the sample S with laser light. Thus, a Raman spectroscopic image can be measured in a short time. The ability to measure Raman spectra in a short time enables measurement at low phototoxicity. The unnecessity to label the sample S with a fluorescent material or the like enables label-free spectrometry. The signal light rays L3 from the respective fibers 45 are separately detected. With such a configuration, spectrometry can be performed at a high SN (Signal to Noise) ratio.

Next, details of an illumination method performed by the spectroscopic illumination optical system 10 will be described with reference to FIG. 4. First, an optical image is captured through optical observation with the camera 23 prior to spectrometry. In the optical observation, the observation illumination light L4 from the observation illumination light source 18 illuminates an overall field of view of an objective lens. A user or the processing apparatus 60 extracts a plurality of spots on a sample as ROIs based on the optical image. For example, the processing apparatus 60 displays the optical image on a monitor. The user designates a region of interest with a mouse or the like while looking at the optical image on the monitor. The processing apparatus 60 stores coordinates of the designated region. Accordingly, the ROIs are extracted.

Note that the observation illumination light L4 for capturing the optical image is light from a light source different from the light source of the illumination light L1 at the time of spectrometry. That is, the observation illumination light source 18 and the light source 11 can be switched for use at the time of capturing an optical image and at the time of spectrometry.

The spatial light modulator 12 controls a beam of the illumination light L1 from the light source 11 so as to selectively illuminate the ROIs on the sample S. The spatial light modulator 12 modulates the illumination light L1 such that the illumination light L1 enters only the ROIs. In other words, the spatial light modulator 12 modulates the illumination light L1 such that a place other than the ROIs is not irradiated with the illumination light L1. Accordingly, a plurality of spots extracted as the ROIs are simultaneously illuminated.

The processing apparatus 60 generates a binary image for controlling the spatial light modulator 12. In the binary image, 1 is assigned to the positions to be the ROIs, and 0 is assigned to the positions other than the ROIs, for example. The processing apparatus 60 outputs the binary image for control to the spatial light modulator 12 which is an LCOS device. The spatial light modulator 12 includes a plurality of control pixels and diffracts entering light. The spatial light modulator 12 can control the phase of diffracted light per pixel.

By using the spatial light modulator 12, multiple focuses can be formed on any plurality of spots on the sample S. That is, since the illumination light L1 is focused only on the ROIs, Raman scattered light can be prevented from being produced in the place other than the ROIs. This enables measurement at a high SN ratio. Since the place other than the ROIs is not irradiated with light, phototoxicity on the sample S can be lessened.

Figure 4:
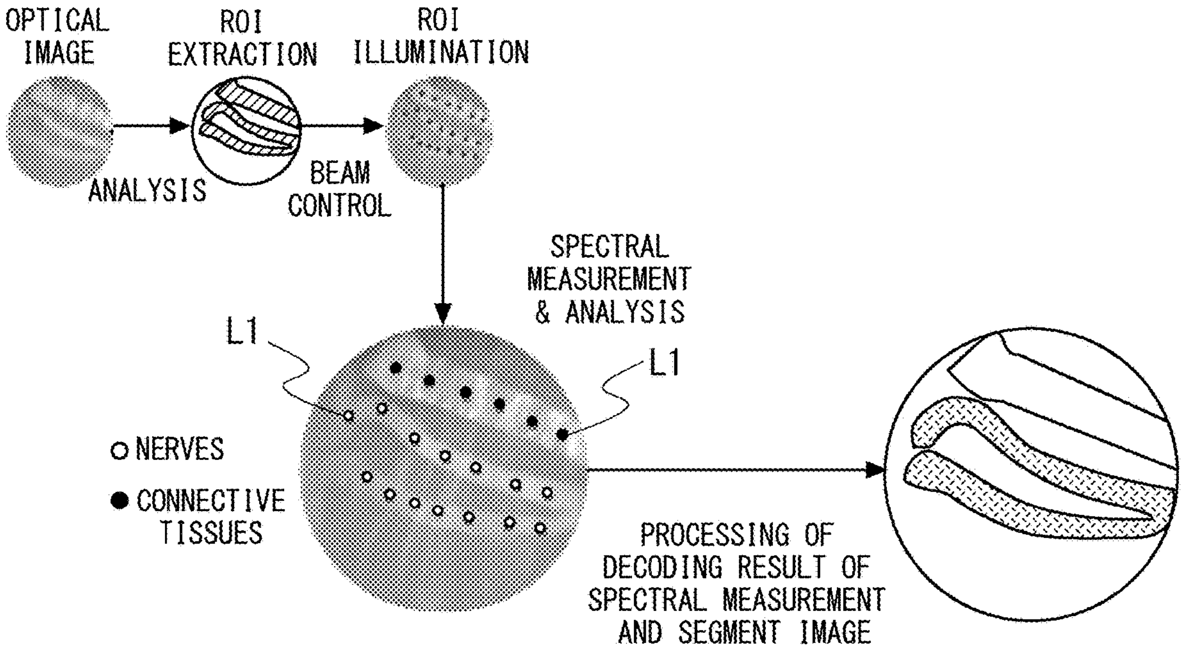
FIG. 4 is a diagram for describing processing of extracting ROIs (regions of interest).

In FIG. 4, connective tissues and nerves of a biological sample are extracted as ROIs. Thus, the spatial light modulator 12 modulates the illumination light L1 such that only the connective tissues and nerves are selectively illuminated. The signal light rays L3 from the ROIs propagate to the spectrophotometer 50 through the fiber unit. The spectrophotometer 50 subjects the signal light rays L3 from the locations illuminated with the illumination light L1 to spectrometry. The processing apparatus 60 generates a spectroscopic image based on a result of spectral measurement of the spectrophotometer 50.

The processing apparatus 60 performs processing of decoding the result of spectral measurement and a segment image. Therefore, the processing apparatus 60 generates an image based on the segment image of an optical image in the region other than the ROIs and generates an image based on the result of spectral measurement for the ROIs. Accordingly, a more appropriate spectroscopic image can be generated and displayed. In the spectroscopic image, spectral information is included in the ROIs.

Figure 5:
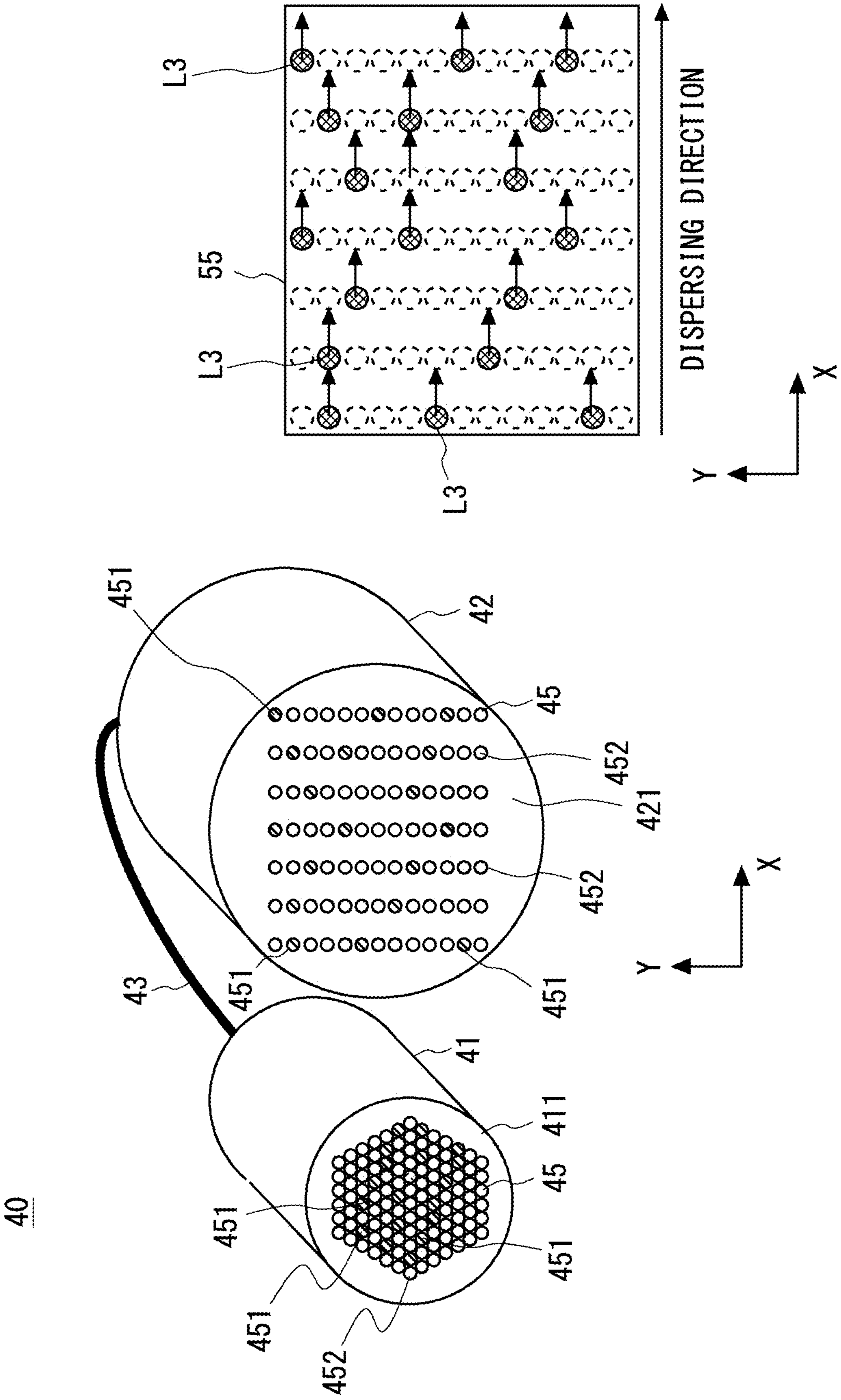
FIG. 5 is a diagram for describing spectrometry of signal light rays from the ROIs.

FIG. 5 is a diagram for describing the fiber unit 40 when the illumination light L1 selectively illuminates only the ROIs. FIG. 5 shows the entrance end surface 411 and the exit end surface 421 of the fiber unit 40. The light receiving surface of the photodetector 55 at which the signal light rays L3 exited from the fiber unit 40 are detected is also shown.

FIG. 5 shows the fibers 45 corresponding to the ROIs as fibers 451 and the fibers 45 corresponding to a region other than the ROIs as fibers 452. An image of the ROIs is formed on the entrance end surface 411. The positions of the fibers 451 at the entrance end surface 411 correspond to the ROIs. The signal light rays L3 from the ROIs enter the fibers 451. The region other than the ROIs is not illuminated with the illumination light L1. Thus, the signal light rays L3 are not produced in the region other than the ROIs. Thus, the signal light rays L3 do not enter the fibers 452.

When the signal light rays L3 exit from the fibers 451 at the exit end surface 421, the spectrophotometer 50 disperses the signal light rays L3. The signal light rays L3 are dispersed in the X direction at the light receiving surface of the photodetector 55. The signal light rays L3 from the respective fibers 451 are detected without being overlapped at the light receiving surface. Thus, the signal light rays L3 from respective spots on the sample S can be appropriately subjected to spectrometry. Since light from the region other than the ROIs can be reduced, noise light can be prevented. This enables measurement at a high SN ratio. Thus, an appropriate spectroscopic image can be generated by short-time measurement.

Note that although the multi-line arranging direction and the pixel arranging direction are parallel in FIG. 5, the multi-line arranging direction and the pixel arranging direction may not be parallel. In addition, the dispersing direction and the pixel arranging direction may not be parallel.

Figure 6:
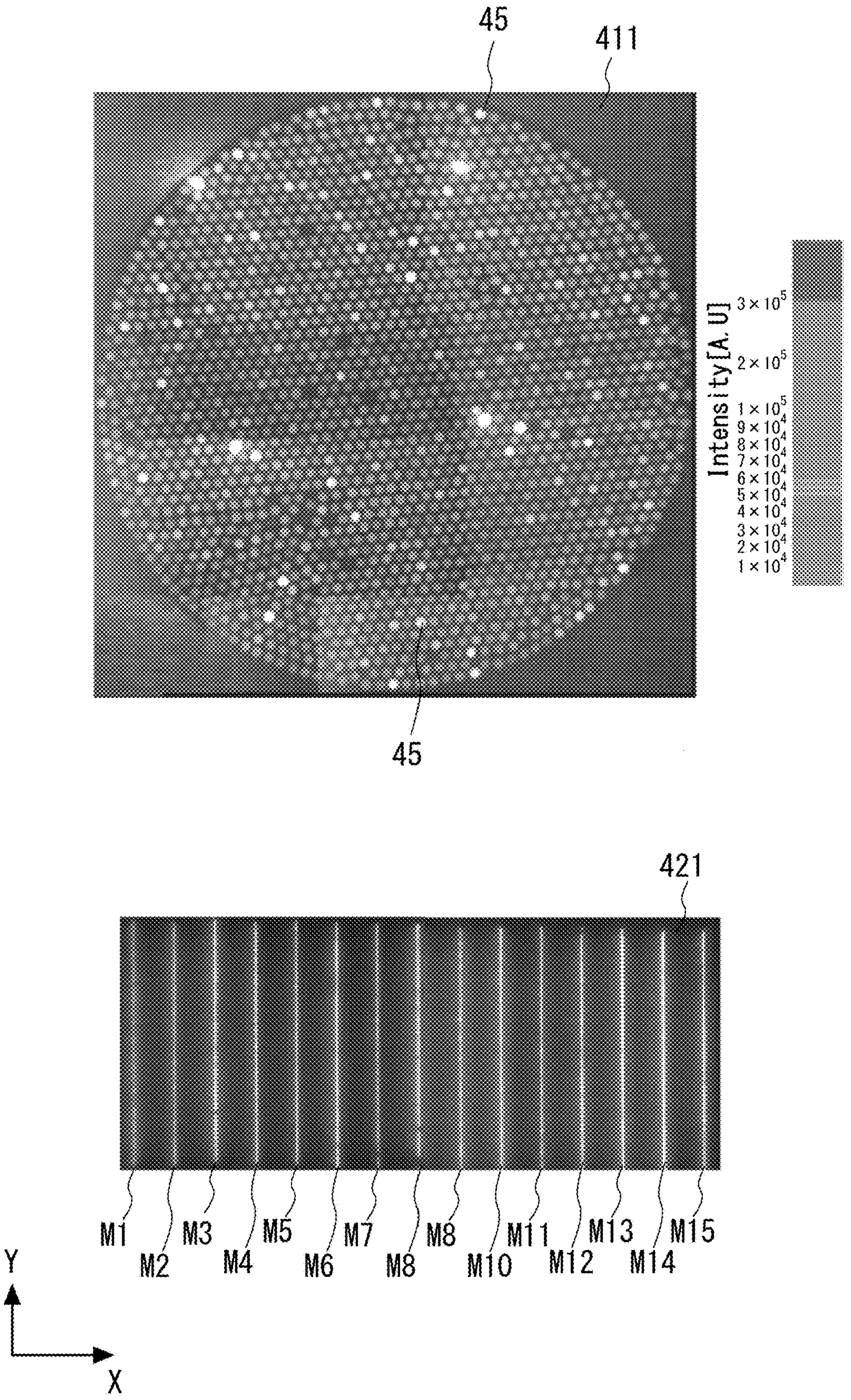
FIG. 6 is a diagram showing images of an entrance end and an exit end of a fiber unit 40.

FIG. 6 is a diagram showing images of the entrance end surface 411 and the exit end surface 421. At the entrance end surface 411, the plurality of fibers 45 are laid out in proximity. The plurality of fibers 45 have a close-packed arrangement. At the exit end surface 421, the plurality of fibers 45 have the multi-line arrangement. In FIG. 6, fifteen lines M1 to M15 are formed at the exit end surface 421.

The spectrometry method according to the present embodiment includes steps of illuminating a sample using illumination light from a light source, causing signal light rays from the sample to enter a fiber unit from an entrance end surface at which a plurality of fibers are adjacently arranged, causing the signal light rays to exit from an exit end surface of the fiber unit at which the plurality of fibers are arranged in a multi-line shape at intervals, dispersing the signal light rays exited from the exit end surface and detecting the signal light rays by a two-dimensional array photodetector, and referring to a layout relationship among the plurality of fibers at the entrance end surface and the exit end surface of the fiber unit, generating a spectroscopic image of the sample from a result of detection by the two-dimensional array photodetector.

Example 1

Figure 7:
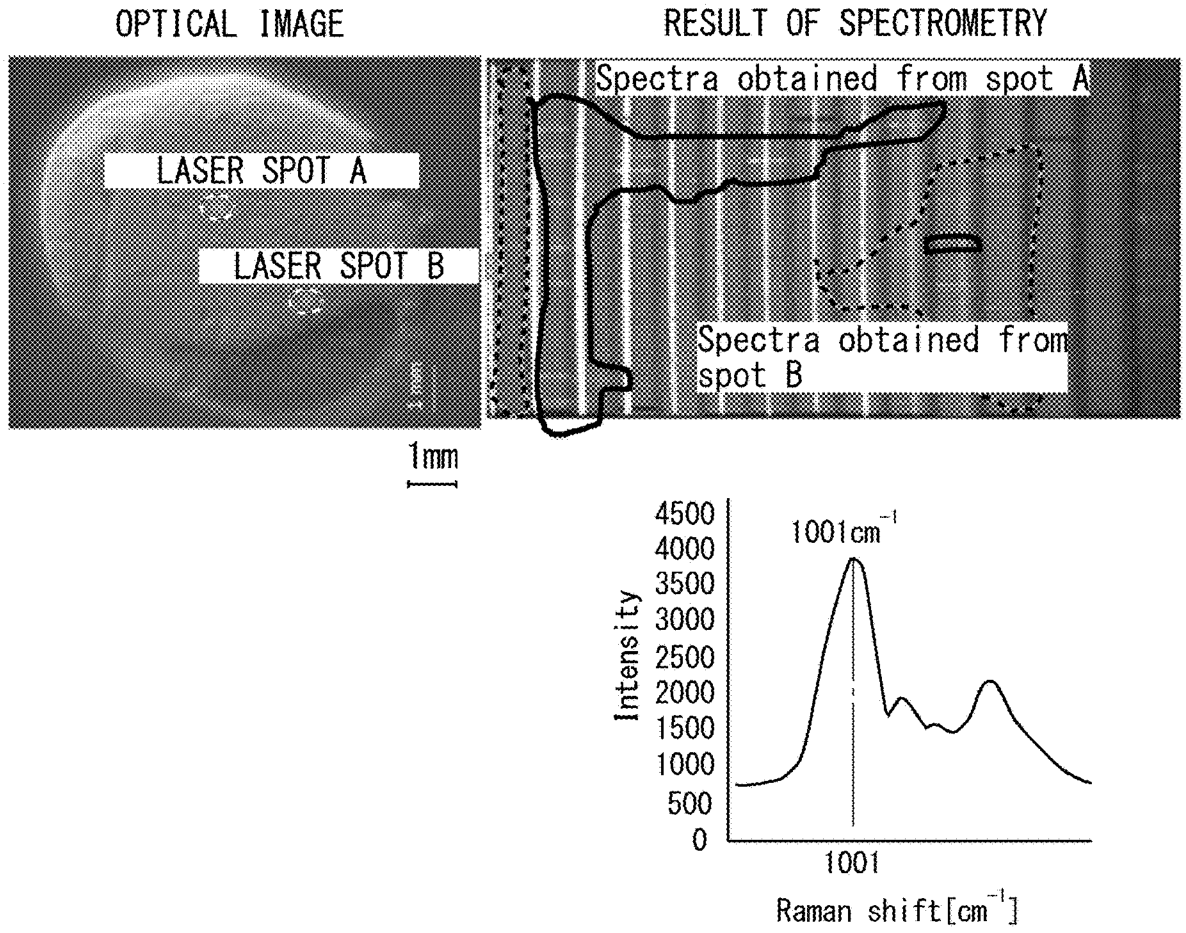
FIG. 7 is a diagram showing a result of spectrometry of Example 1.

Example 1 will be described with reference to FIG. 7. FIG. 7 shows an optical image of the sample S and a result of spectrometry of Raman scattered light. The result of spectrometry shows a light amount detected by each pixel of the photodetector 55. In Example 1, the sample S is polystyrene. Herein, the spectroscopic illumination optical system 10 selectively illuminates laser spots A and B as ROIs. The signal light rays L3 from the laser spots A and B enter the spectrophotometer 50 through the fiber unit 40. At the light receiving surface of the photodetector 55, the signal light rays from the laser spot A and the laser spot B enter different pixels. Thus, respective Raman spectra can be measured by different pixels of the photodetector 55.

Example 2

Figure 8:
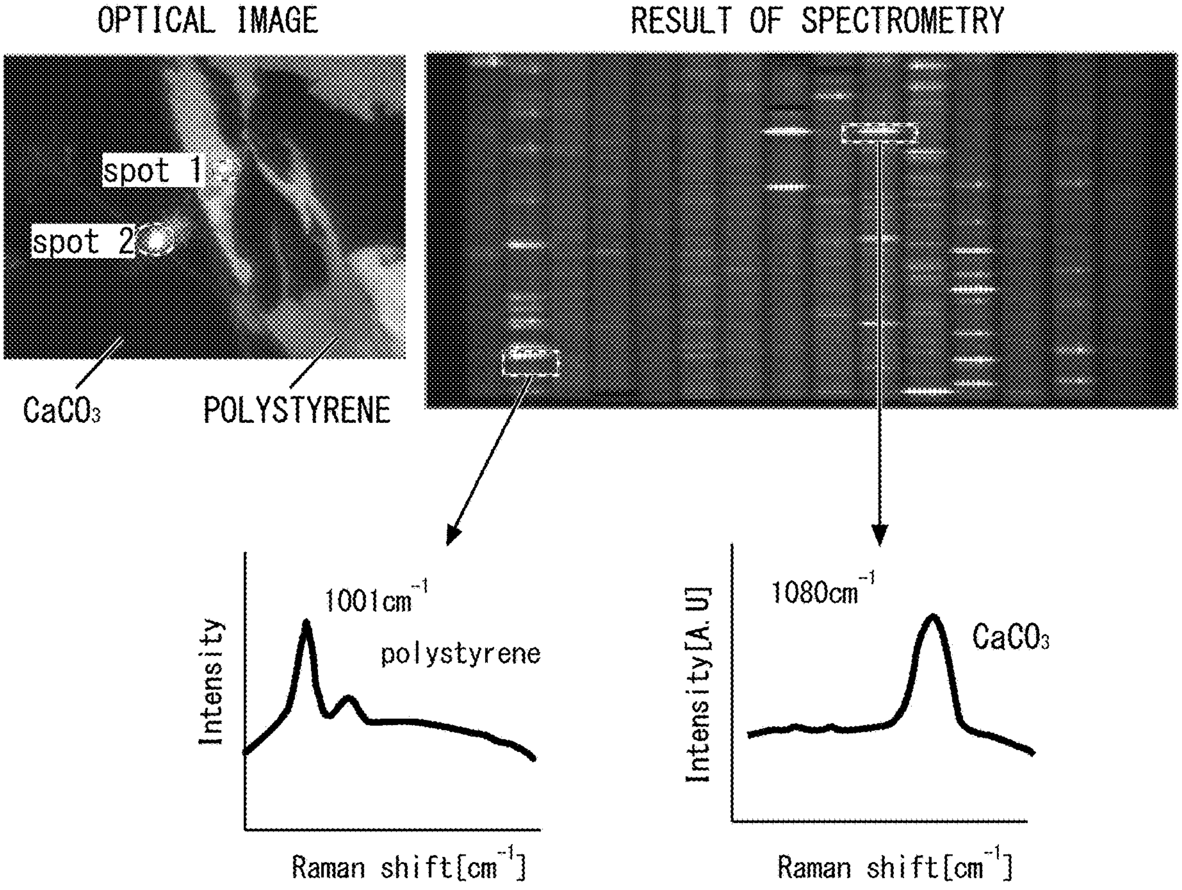
FIG. 8 is a diagram showing a result of spectrometry of Example 2.

Example 2 will be described with reference to FIG. 8. FIG. 8 shows an optical image of the sample S and a result of spectrometry of Raman scattered light. In Example 1, the sample S contains polystyrene and calcium carbonate ($CaCO_3$). A spot 1 and a spot 2 in FIG. 8 are ROIs.

Herein, each of polystyrene and calcium carbonate is extracted as an ROI. Specifically, the spot 1 corresponds to polystyrene, and the spot 2 corresponds to calcium carbonate. The signal light rays L3 from the spot 1 and the signal light rays L3 from the spot 2 enter different pixels at the light-receiving surface. Thus, respective Raman spectra can be measured by different pixels of the photodetector 55. A peak wavelength of the Raman spectrum of polystyrene is different from the peak wavelength of the Raman spectrum of calcium carbonate.

Example 3

Figure 9:
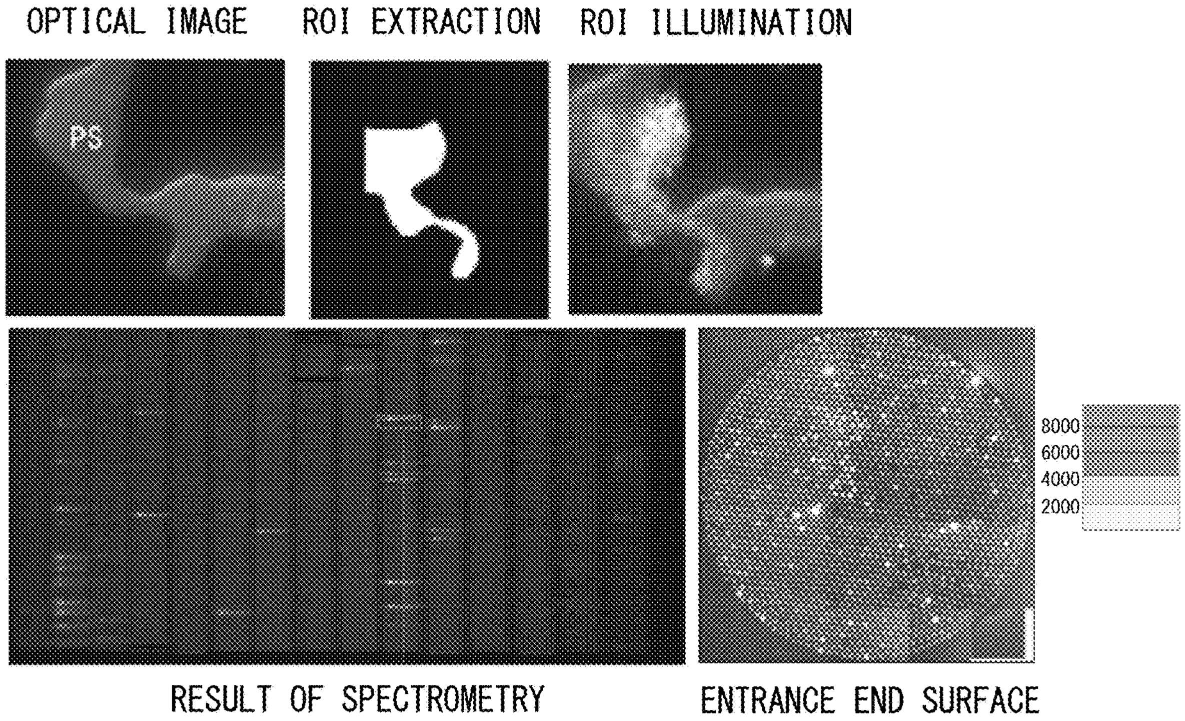
FIG. 9 is a diagram showing a result of spectrometry of Example 3.

FIG. 9 shows images showing ROI extraction and ROI illumination in which an ROI is selectively illuminated. In Example 3, the sample S is polystyrene. The ROI is extracted from the optical image of the sample S. The ROI is selectively illuminated. FIG. 9 shows an image of the entrance end surface when the ROI is illuminated, and a result of spectrometry. Signal light rays from a plurality of spots on the sample S are detected by different pixels.

Note that although it has been mainly described that signal light rays are Raman scattered light in the above embodiment, the signal light rays may be light other than Raman scattered light. Therefore, the spectrometry apparatus according to the present embodiment may be a spectrometry apparatus for a purpose other than Raman spectroscopy. For example, a spectrometry apparatus that detects fluorescence excited by excitation light or a spectrometry apparatus that measures ultraviolet absorption spectra or near-infrared absorption spectra may be adopted. These spectrometry apparatuses can also perform spectral measurement at a high SN ratio. In particular, the spectrometry apparatus according to the present embodiment is suitable for a spectrometry apparatus required to perform high-speed measurement or repeated measurement.

The sample S as a measurement target can be a biological sample or a medical sample. Alternatively, the sample S can be a sample for pathological diagnosis, a drug-discovery sample, food, a cosmetic product, an advanced material, a device, or the like. The use of a result of spectrometry can contribute to quality management. The sample S can also be various samples in the field science (the outer space, ocean, biology) or the like. By integrating the spectrometry apparatus with an endoscope, the inside of a target object can be inspected. Note that the endoscope may be a rigid endoscope, a soft endoscope, a medical endoscope, or an industrial endoscope.

Example 4

Figure 10:
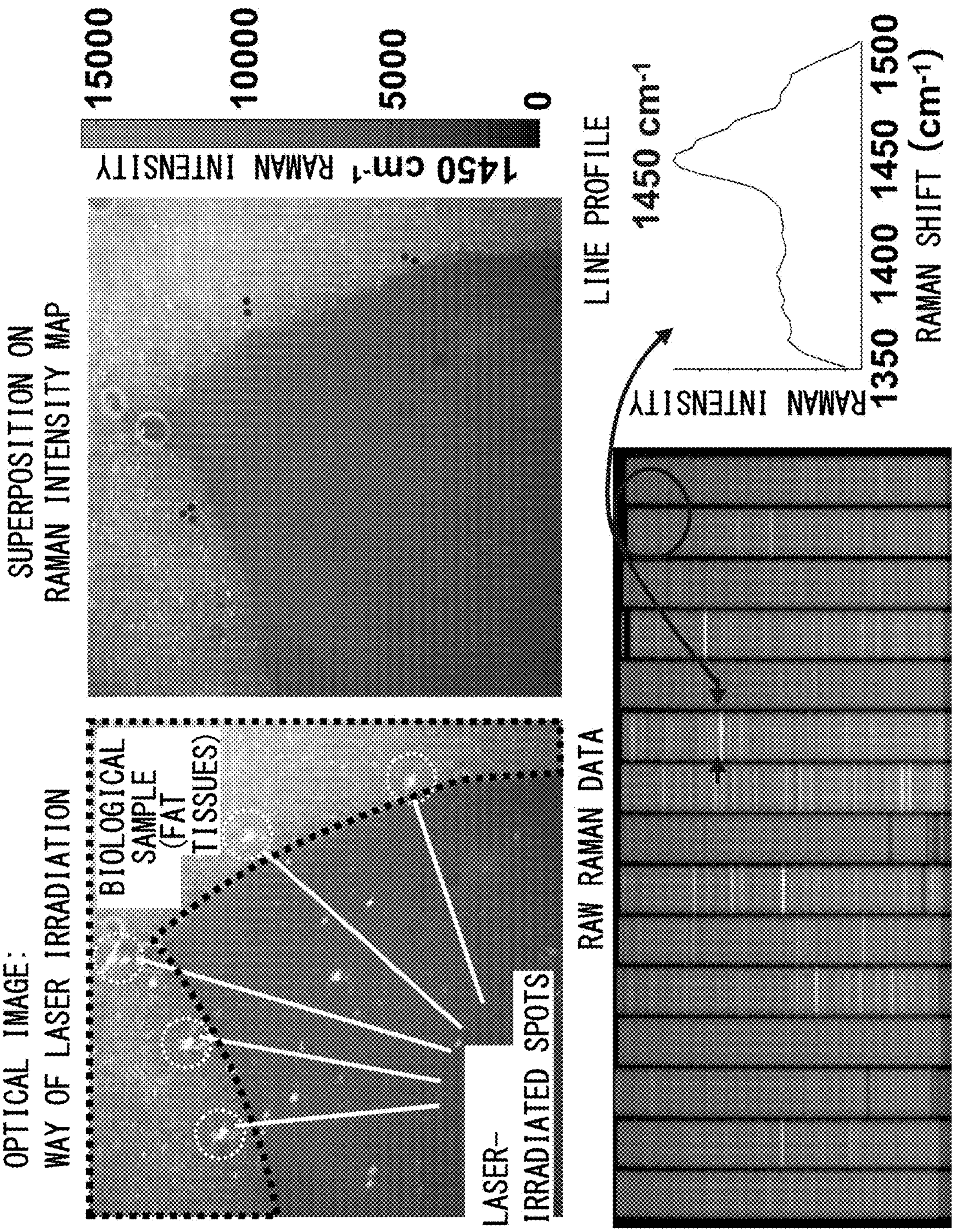
FIG. 10 is a diagram showing a result of spectrometry of Example 4.

FIG. 10 is a diagram showing a result of measurement of a biological sample. In the Example, an optical image obtained by capturing an image of fat tissues as a sample, and a result of spectrometry thereof are shown. ROIs are extracted from the optical image. FIG. 10 shows the ROIs as laser-irradiated spots. The ROIs are selectively irradiated with laser light to be excitation light.

Part or whole of the processing in the processing apparatus 60 described above can be implemented as a computer program. Such a program can be stored using various types of non-transitory computer-readable media and can be supplied to a computer. The non-transitory computer-readable media include various types of substantial recording media. Examples of the non-transitory computer-readable media include a magnetic recording medium (for example, a flexible disc, a magnetic tape, a hard disk drive), a magneto-optical recording medium (for example, a magneto-optical disk), a CD-ROM (Read Only Memory), a CD-R, a CD-R/W, a semiconductor memory (for example, a mask ROM, a PROM (Programmable ROM), an EPROM (Erasable PROM), a flash ROM, and a RAM (Random Access Memory)). Alternatively, the program may be supplied to a computer through various types of transitory computer-readable media. Examples of the transitory computer-readable media include an electric signal, an optical signal, and an electromagnetic wave. The transitory computer-readable media can supply the program to the computer via a wired communication path such as an electric wire or an optical fiber or a wireless communication path.

Although the invention made by the inventor of the present invention has been specifically described based on the embodiment, it is needless to say that the present invention is not limited to the above-described embodiment and can be variously modified without departing from the spirit of the invention.

The present application claims priority to Japanese Patent Application No. 2022-009137, filed on Jan. 25, 2022, the entire disclosure of which is hereby incorporated.

REFERENCE SIGNS LIST

1 SPECTROMETRY APPARATUS
10 SPECTROSCOPIC ILLUMINATION OPTICAL SYSTEM
11 LIGHT SOURCE
12 SPATIAL LIGHT MODULATOR
13 DICHROIC MIRROR
14 DICHROIC MIRROR
15 LENS
18 OBSERVATION ILLUMINATION LIGHT SOURCE
20 OBSERVATION OPTICAL SYSTEM
21 FILTER
22 LENS
23 CAMERA
30 SPECTROMETRIC OPTICAL SYSTEM
31 FILTER
32 LENS
40 FIBER UNIT
41 ENTRANCE-SIDE HOLDER
42 EXIT-SIDE HOLDER
45 FIBER
50 SPECTROPHOTOMETER
51 LENS
52 GRATING
54 LENS
55 PHOTODETECTOR
60 PROCESSING APPARATUS
L1 ILLUMINATION LIGHT
L2 OBSERVATION LIGHT
L3 SIGNAL LIGHT RAY

The invention claimed is:

1. A spectrometry apparatus comprising:

a light source that produces illumination light;

a spectrophotometer that disperses signal light rays from a sample illuminated with the illumination light and detects the signal light rays by a two-dimensional array photodetector;

a fiber unit having a plurality of fibers laid out in an optical path from the sample to the spectrophotometer, the plurality of fibers being adjacently arranged at an entrance end surface of the fiber unit, and the plurality of fibers being arranged in a multi-line shape at intervals at an exit end surface;

a processing unit that, by referring to a layout relationship among the plurality of fibers at the entrance end surface and the exit end surface of the fiber unit, generates a spectroscopic image of the sample from a result of detection by the two-dimensional array photodetector, and a spatial light modulator that modulates the illumination light from the light source so as to selectively illuminate a plurality of spots on regions of interest of the sample, wherein signal light rays from the plurality of spots enter the fibers of the fiber unit, respectively, wherein the entrance end surface of the fiber unit is laid out at a position conjugate to the sample so that an image of the regions of interest of the sample is formed on the entrance end surface.

2. The spectrometry apparatus according to claim 1, further comprising a camera that captures an optical image of the sample, wherein the plurality of spots on the regions of interest of the sample extracted based on the optical image are selectively illuminated.

3. The spectrometry apparatus according to claim 1, wherein the plurality of fibers have a hexagonal close-packed arrangement at the entrance end surface of the fiber unit.

4. The spectrometry apparatus according to claim 1, wherein signal light rays exited from different ones of the fibers are detected without being overlapped at a light-receiving surface of the two-dimensional array photodetector.

5. The spectrometry apparatus according to claim 1, wherein signal light rays from the plurality of spots enter the fibers of the fiber unit, respectively and each respective signal light ray is subjected to spectrometry simultaneously to generate the spectroscopic image.

6. The spectrometry apparatus according to claim 4, wherein signal light rays from the plurality of spots enter each of the respective fibers of the fiber unit simultaneously, and each respective signal light ray is subjected to spectrometry simultaneously to generate the spectroscopic image.

7. A spectrometry method comprising steps of:

illuminating a sample using illumination light from a light source;

causing signal light rays from the sample to enter a fiber unit from an entrance end surface at which a plurality of fibers are adjacently arranged;

causing the signal light rays to exit from an exit end surface of the fiber unit at which the plurality of fibers are arranged in a multi-line shape at intervals;

dispersing the signal light rays exited from the exit end surface and detecting the signal light rays by a two-dimensional array photodetector; and referring to a layout relationship among the plurality of fibers at the entrance end surface and the exit end surface of the fiber unit, generating a spectroscopic image of the sample from a result of detection by the two-dimensional array photodetector, wherein a spatial light modulator modulates the illumination light from the light source so as to selectively illuminate a plurality of spots on regions of interest of the sample, and signal light rays from the plurality of spots enter the fibers of the fiber unit, respectively, wherein the entrance end surface of the fiber unit is laid out at a position conjugate to the sample so that an image of the regions of interest of the sample is formed on the entrance end surface.

8. The spectrometry method according to claim 7, wherein an optical image of the sample is captured by a camera, and the plurality of spots on the regions of interest of the sample extracted based on the optical image are selectively illuminated.

9. The spectrometry method according to claim 7, wherein the plurality of fibers have a hexagonal close-packed arrangement at the entrance end surface of the fiber unit.

10. The spectrometry method according to claim 7, wherein signal light rays exited from different ones of the fibers are detected without being overlapped at a light-receiving surface of the two-dimensional array photodetector.

* * * * *